Figure 7:
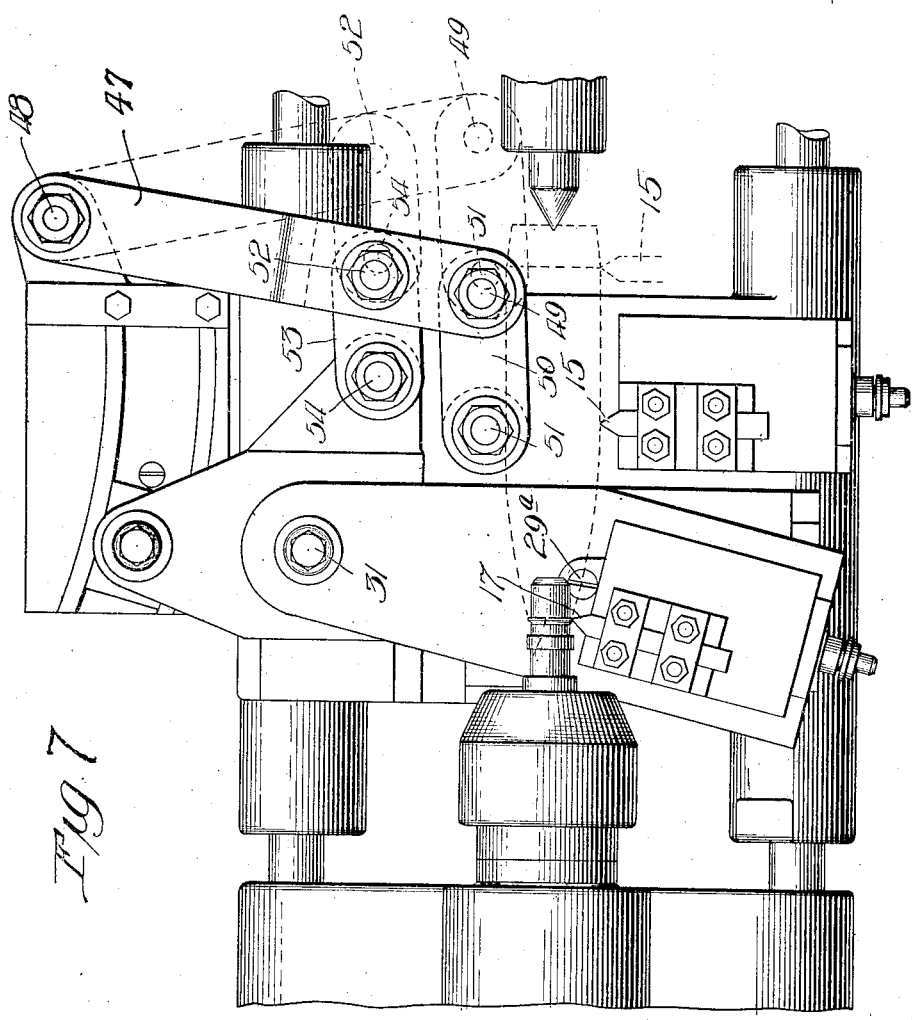

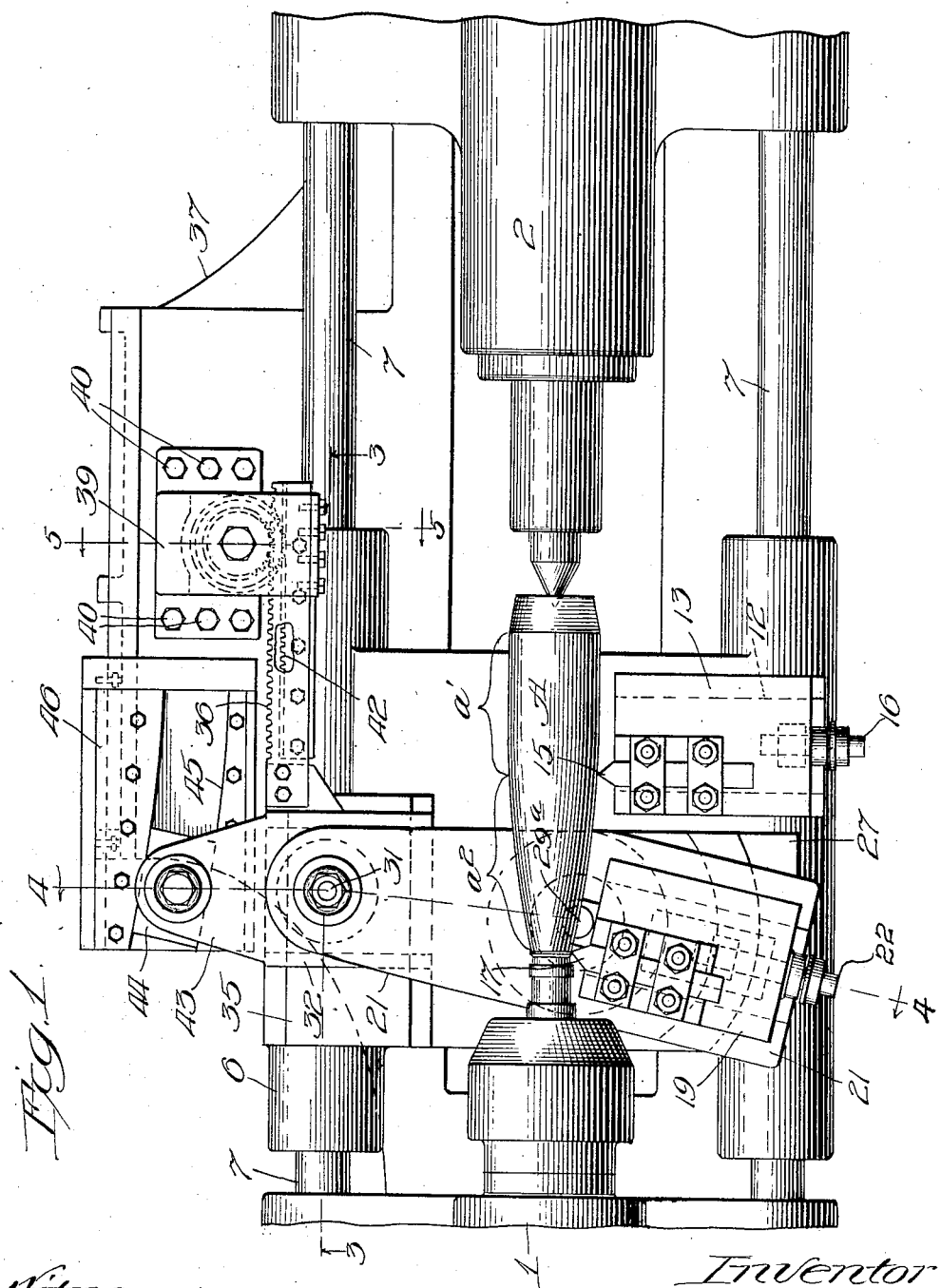

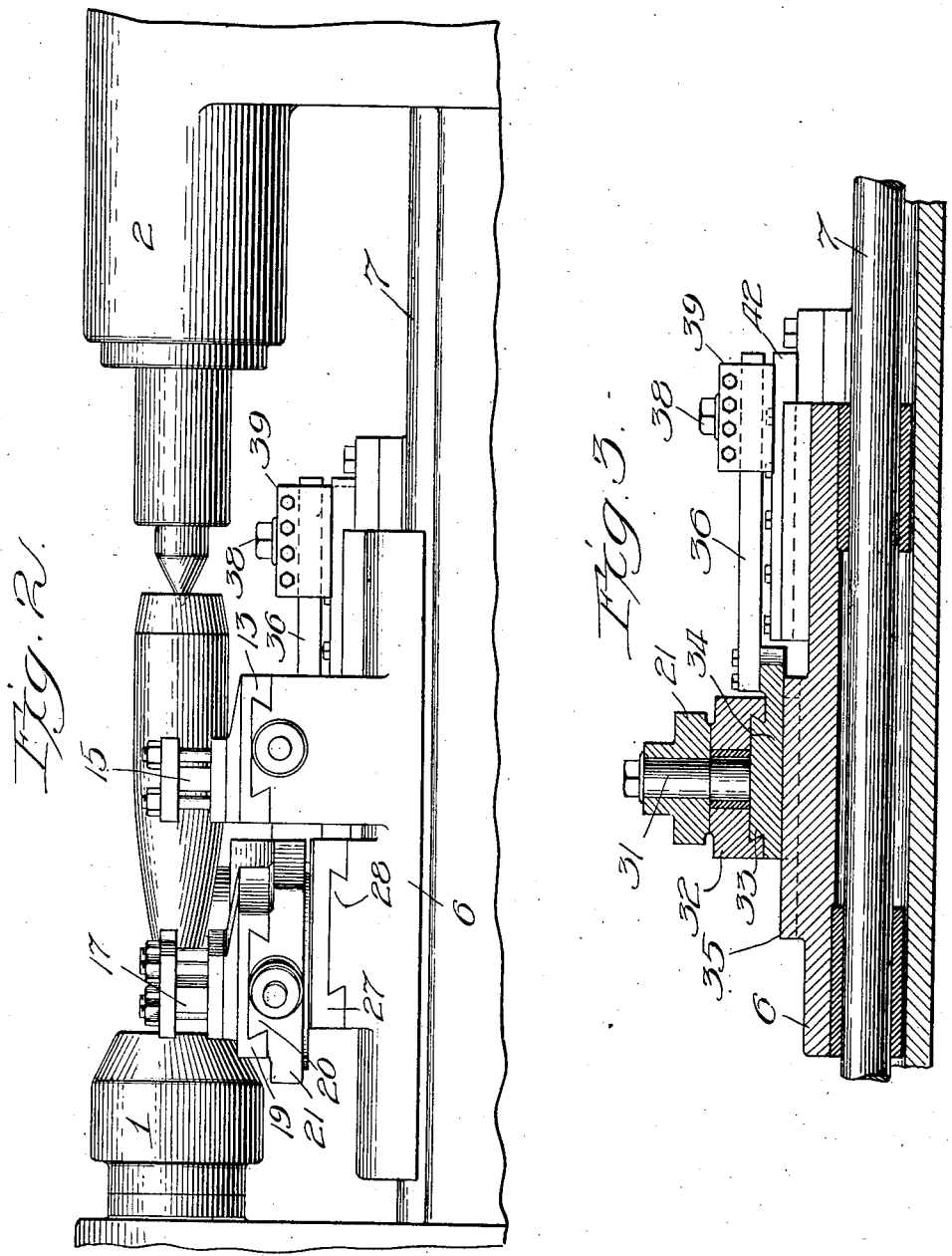

D. L. DERROM.
LATHE.
APPLICATION FILED MAY 20, 1918.
1,329,042.
Patented Jan. 27, 1920.
5 SHEETS—SHEET 3.
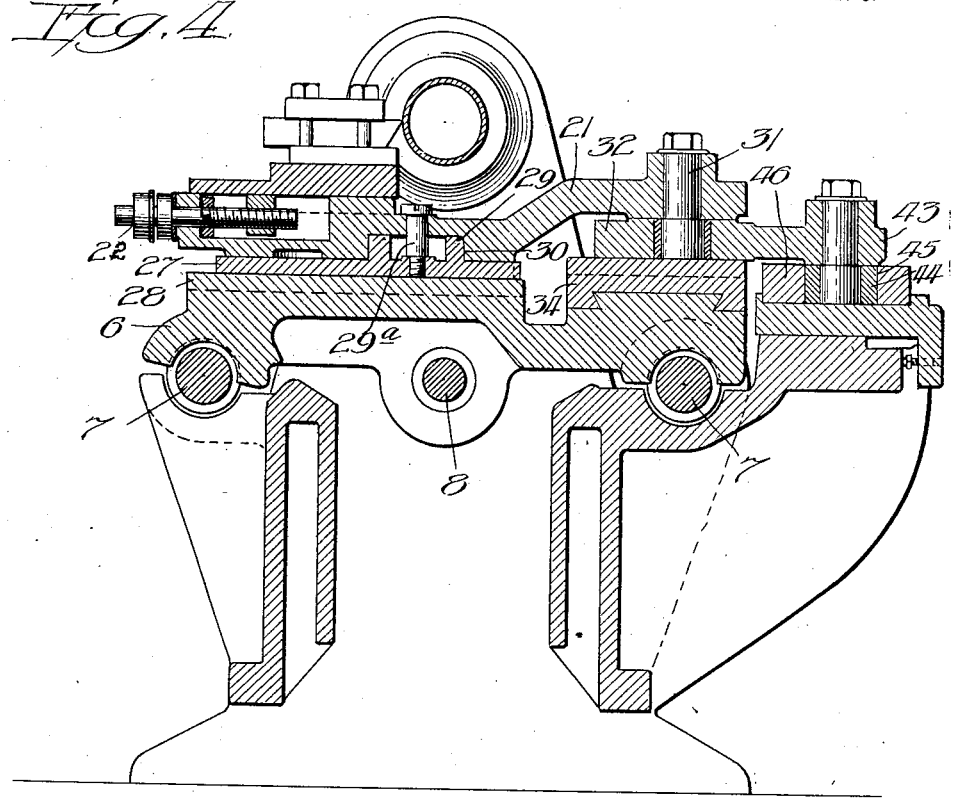
Witness:
Harry S. Gaither
Inventor
D. L. Derrom
By Miller Chindohl Parker
Attys

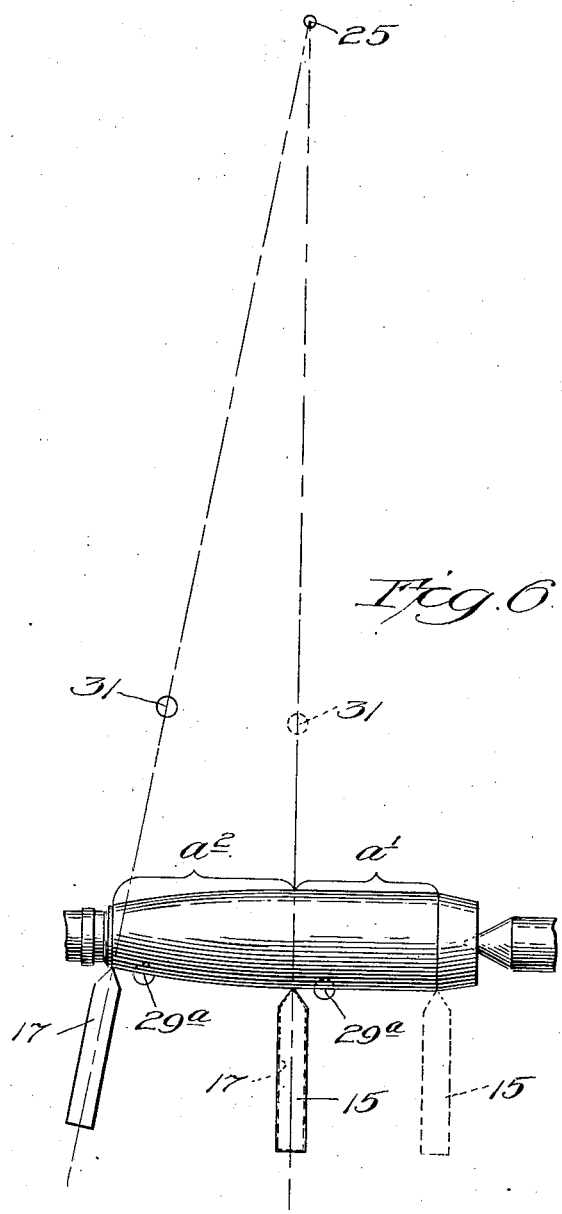

D. L. DERROM.
LATHE.
APPLICATION FILED MAY 20, 1918.

1,329,042.

Patented Jan. 27, 1920.
5 SHEETS—SHEET 5.

Witness:
Harry S. Gaither

Inventor
D. L. Derrom
By Miller, Chrisdahl & Parker,
Attys

UNITED STATES PATENT OFFICE.

DONALD L. DERROM, OF CHICAGO, ILLINOIS.

LATHE.

1,329,042.

Specification of Letters Patent.   Patented Jan. 27, 1920.

Application filed May 20, 1918. Serial No. 235,600.

*To all whom it may concern:*

Be it known that I, DONALD LAIRD DERROM, a subject of the King of Great Britain, residing at Chicago, in the county of Cook and State of Illinois, have invented certain new and useful Improvements in Lathes, of which the following is a specification.

This invention relates to means for automatically producing a surface such as that generated by the revolution of an arc of a circle about an axis not its own. The invention has particular reference to a machine for automatically turning such a conoidal surface synchronously with the turning of a cylindrical surface. A machine of this character is useful in the production of ordnance shells.

In Patent No. 1,264,375, dated April 30, 1918, I have disclosed a machine of the above-mentioned type. Said machine comprises a radius bar that carries the tool for turning the conoidal surface or nose of the shell. With a radius bar arranged in the manner shown in said application, it is impracticable to turn a shell having a nose of large radius on account of the floor space required. The object of the present invention is to produce a radius-bar mechanism which shall not be subject to the limitation just referred to and whereby curved surfaces of any radii within reason may be turned.

In the accompanying drawings, Figure 1 is a fragmental top plan view of a lathe embodying the features of my invention. Fig. 2 is a fragmental front elevation. Fig. 3 is a sectional view taken approximately in the plane of dotted line 3—3 of Fig. 1. Fig. 4 is a sectional view taken in the plane of dotted line 4—4 of Fig. 1. Fig. 5 is a section on line 5—5 of Fig. 1. Fig. 6 is a diagram illustrating the operation of the mechanism. Fig. 7 illustrates an alternative construction.

The embodiment selected to illustrate the invention comprises a head stock 1 and a tail stock 2 of any suitable construction. While the invention may be used in producing various kinds of articles, the present embodiment of the invention is particularly adapted for turning the cylindrical body $a^1$ and the conoidal nose $a^2$ of a shell A. The shell may be supported between the head stock and the tail stock in any suitable manner.

The tool carriage may be of any suitable construction and may be mounted in any preferred manner. Herein I have shown a carriage 6 slidably mounted upon two parallel guides 7 extending parallel to the axes of the head stock and the tail stock. Any ordinary or preferred means may be used to move the carriage 6 upon the guides 7, as, for example, a lead screw 8 (Fig. 4).

The carriage 6 is arranged to support a tool for turning the cylindrical body $a^1$ of the shell and is also arranged to impart movement to a tool for turning the conoidal nose of the shell. The means for supporting the body-turning tool may be of any preferred construction. Herein the carriage 6 is shown as provided with a guide 12 extending transversely of the path of movement of the carriage. On this guide is mounted a cross slide 13 carrying a cutter 15. Any suitable means, as, for example, a screw 16, may be employed to set the cross slide 13 upon the carriage 6 at the desired distance from the axis of the shell.

The tool 17 for turning the conoidal nose of the shell is fixed upon a slide 19. Said slide in turn is mounted upon a guide 20 on a radius bar 21. Suitable means such as a screw 22 is provided for setting the tool 17 in desired position upon the radius bar.

Means is provided for connecting the radius bar to the carriage 6 so that said bar shall be swung as the carriage is moved upon its guides 7. The means herein shown for thus connecting the radius bar to the carriage comprises a slide 27 mounted on a guide 28 on the carriage 6, which guide extends at a right angle to the direction of travel of the carriage. Upon the upper side of the slide is a circular boss 29 (Fig. 4) that fits into a circular recess 30 in the lower side of the radius bar 21 and serves as a pivot connecting the radius bar and the slide 27. A screw $29^a$ extending axially of the boss 29 prevents upward displacement of the radius bar 21. It will be seen that as the carriage 6 is moved upon its guides 7, the radius bar 21 will be pivotally moved, the slide 27 moving in or out upon its guide 28.

For the sake of illustration, the shell A may be assumed to be a 155 millimeter shell having a nose radius of 65.47 inches. The radius bar 27, therefore, should swing as if it were mounted upon a pivot at 25 (Fig. 6). The point 25, however, is much too far away from the lathe to make it practicable to use a radius bar pivoted at said point. I, therefore, employ the construction to be now described. The radius bar 21 is pivoted upon a vertical stud 31 fixed to a slide 32. The slide 32 is mounted upon a guide 33 which extends transversely of the path of travel of the carriage 6. The guide 33 is formed upon a slide 34 which is mounted upon a guide 35 formed upon the carriage 6 and extending parallel with the direction of travel of said carriage. The tool 17 and the center 31 are at opposite sides of the axis of the work. Inasmuch as the tool 17 is to be moved in the arc of a circle struck from the center 25, it is necessary to move the center 31 on the arc of a circle struck from said center 25. Such movement is imparted to the center 31 by the following described means.

The slide 34 is moved upon its guide 35 by means of a rack bar 36 fixed to said slide and meshing with a pinion 37 mounted upon a vertical pivot 38 carried by a bracket or box 39 which is rigidly secured to the lathe bed by means of screws 40. The pinion 37 is rigid with a larger pinion 41 that meshes with a rack bar 42. Said rack bar is rigidly secured to the carriage 6 so that in the movement of the carriage 6 the pinions 41 and 37 will be rotated and the slide 34 moved in the same direction as, but more slowly than, the carriage 6. Since the centers 29$^a$ and 31 travel at different rates of speed, the radius bar 21 will swing upon the center 31.

The slide 32 that carries the center 31 has a short rearward extension or arm 43 to which is pivoted a block or follower 44. Said follower is movable in the cam groove 45 of a cam block 46 which is rigidly secured to the lathe bed. When turning an article, the conoidal surface of which merges in the cylindrical surface, as in the case of the shell A, the tools should be so set that the points of the cutters are at the same distance from the axis of the shell when the radius bar 21 extends at a right angle with the axis of the shell.

The operation is as follows: In the travel of the carriage 6, the cutter 15 is moved in a straight line along the shell to turn the cylindrical body $a^1$. Since the slide 34 travels more slowly than the carriage 6, the radius bar 21 is swung from its center 31. At the same time the slide 32, carrying the center 31 is moved upon its guide 33 by the action of the cam 45 in the travel of the carriage 6. As a result of the compound movement imparted to the slide 32, the points 29$^a$ and 31 move in the arcs of circles struck from the center 25, thus causing the cutter 17 also to move in the arc of a circle struck from the center 25.

The distance between the points 29$^a$ and 31, the ratio of the gearing, and the form of the cam are such that the nose-turning tool 17 finishes its cut in the same time that the body-turning tool 15 completes its cut. A complete cut may therefore be taken along the nose and the body in a single movement of the carriage.

Inasmuch as the cutter 17 occupies an invariable relation (i. e., radial) with reference to the curved surface of the shell, said cutter may be given such shape that it will remove the maximum amount of metal and possess maximum durability.

Fig. 7 illustrates one of several constructions which may be used in lieu of the proportional gearing shown in Figs. 1 to 4. 47 is a lever pivoted at one end to a stationary part at 48. The other end of the lever is pivoted at 49 to a link 50 which is pivoted at 51 to the carriage 6. The lever 47 is pivoted at 52 to a link 53, which is pivoted at 54 to the slide 34. The ratio of the lever 48—52 to the lever 48—49 is the same as the ratio of the distance 25—31 to the distance 25—29$^a$, also the same as the ratio of the distance 48—54 to the distance 48—51 when the points 48, 51 and 54 are in a line perpendicular to the direction of travel of the carriage 6.

It will be understood that various changes may be made in the construction herein shown without departing from the spirit and scope of the invention as set forth in the appended claims. Moreover, the invention is not limited to the turning of shells, but may be employed in turning other articles having conoidal and analogous surfaces.

I claim as my invention:

1. A lathe for turning an article having a conoidal surface and a cylindrical surface, having, in combination, means for supporting and rotating the work, a carriage movable longitudinally of the work, a tool on said carriage for turning the cylindrical portion of the work, a radius bar slidably and pivotally connected with the carriage, a tool on said bar for turning the conoidal portion of the work, a slide mounted on the carriage for movement longitudinally of the work, a slide mounted on the first mentioned slide for movement transversely of the work, the radius bar being pivoted to the second slide, and means for imparting a transverse movement to the second slide as the first slide is moved longitudinally.

2. A lathe for turning an article having a conoidal surface and a cylindrical surface, having, in combination, means for supporting and rotating the work, a carriage movable longitudinally of the work, a tool on the carriage for turning the cylindrical portion of the work, a radius bar slidably and pivotally connected with the carriage, a tool on said bar for turning the conoidal surface of the work, and means actuated in the travel of the carriage for moving the end of said bar in the arc of a smaller circle concentric with the circle on which the second mentioned tool is to be moved.

3. A lathe having, in combination, means for supporting and rotating the work, a carriage movable longitudinally of the work, a radius bar slidably and pivotally connected with the carriage, a tool on the bar, a slide mounted on the carriage for movement longitudinally of the work, a slide mounted on the first mentioned slide for movement transversely of the work, the radius bar being pivoted to the second slide, means actuated by the carriage for moving the first slide at a reduced rate of speed, and means for imparting a transverse movement to the second slide as the first slide is moved longitudinally.

4. A lathe having, in combination, a main framework, means for supporting and rotating the work, a carriage movable longitudinally of the work, a radius bar slidably and pivotally connected with the carriage, a tool on the bar, a slide movable longitudinally of the work, a slide mounted on the first mentioned slide for movement transversely of the work, the radius bar being pivoted to the second slide, reduction gearing connecting the first slide and the carriage and including gear elements supported on the main framework, and means for imparting a transverse movement to the second slide as the first slide is moved longitudinally.

5. A lathe having, in combination, means for supporting the work, a carriage movable longitudinally of the work, a radius bar slidably and pivotally connected with the carriage, a tool on said bar, a slide, means for moving the slide longitudinally of the work at a lower rate of speed than the carriage, a slide mounted on the first mentioned slide for movement transversely of the work, the radius bar being pivoted to the second slide, and a stationary grooved cam for imparting a transverse movement to the second slide as the first slide is moved longitudinally.

6. A lathe having, in combination, means for supporting and rotating the work, a carriage movable longitudinally of the work, a radius bar slidably and pivotally connected with the carriage, a tool on said bar, a slide, means for moving the slide longitudinally of the work at a speed lower than that of the carriage, a slide mounted on the first mentioned slide for movement transversely of the work, the radius bar being pivoted to the second slide, and means for imparting a transverse movement to the second slide as the first slide is moved longitudinally.

7. A lathe having, in combination, a main framework, means for supporting and rotating the work, a carriage movable longitudinally of the work, a radius bar slidably and pivotally connected with the carriage, a slide mounted on the carriage for movement longitudinally of the work, a rack attached to the carriage, a pinion on the main framework in mesh with the rack, a second pinion rigid with the first pinion, said pinions being of different diameters, a rack attached to the slide and meshing with the second pinion, a slide mounted on the first slide for movement transversely of the work, a cam on the main framework for imparting transverse movement to the second slide in the movement of the first slide, the radius bar being pivoted to the second slide, and a tool on the radius bar.

8. A lathe having, in combination, a main framework, means for supporting and rotating the work, a carriage movable longitudinally of the work, a radius bar slidably and pivotally connected with the carriage, a tool on said bar, a slide mounted on the carriage for movement longitudinally of the work, a rack attached to the carriage, a pinion on the main framework in mesh with the rack, a second pinion rigid with the first pinion, said pinions being of different diameters, a rack attached to the slide and meshing with the second pinion, a slide mounted on the first slide for movement transversely of the work, and means for imparting transverse movement to the second slide in the movement of the first slide, the radius bar being pivoted to the second slide.

9. A lathe having, in combination, a main framework, means for supporting and rotating the work, a carriage movable longitudinally of the work, a slide mounted on the carriage for movement longitudinally of the work, a rack attached to the carriage, a pinion on the main framework in mesh with the rack, a second pinion rigid with the first pinion, said pinions being of different diameters, a rack attached to the slide and meshing with the second pinion, a slide mounted on the first slide for movement transversely of the work, a cam on the main framework imparting transverse movement to the second slide in the movement of the first slide, and a tool carrier pivoted to the second slide and connected to the carriage.

10. A lathe having, in combination, means for supporting and rotating the work, a carriage movable longitudinally of the work, a radius bar slidably and pivotally connected with the carriage a tool on said bar, a slide movable longitudinally of the work, a slide mounted on the first mentioned slide for movement transversely of the work the radius bar being pivoted to the second slide, and a stationary grooved cam for imparting a transverse movement to the second slide as the first slide is moved longitudinally.

11. A lathe having, in combination, means for supporting and rotating the work, a carriage movable longitudinally of the work, a radius bar slidably and pivotally connected with the carriage, a tool on the bar, a slide mounted on the carriage for movement longitudinally of the work, a slide mounted on the first mentioned slide for movement transversely of the work, the radius bar being pivoted to the second slide, and means for imparting a transverse movement to the second slide as the first slide is moved longitudinally.

12. A lathe having, in combination, means for supporting and rotating the work, a slide movable longitudinally of the work, a slide mounted on the first mentioned slide for movement transversely of the work, a tool carrier pivoted at one end to the second slide, a stationary cam for imparting transverse movement to the second slide as the first slide is moved longitudinally, and means for moving the other end of the tool carrier longitudinally of the work at a different speed from the first slide.

13. A lathe having, in combination, means for supporting and rotating the work, a carriage movable longitudinally of the work, a radius bar slidably and pivotally connected with the carriage, a tool on said bar, a member to which the radius bar is pivoted, and means actuated in the travel of the carriage for moving said member in the arc of a circle concentric with the circle on which the tool is to be moved.

14. A lathe having, in combination, means for supporting and rotating the work, a carriage movable longitudinally of the work, a radius bar slidably and pivotally connected with the carriage, a tool on said bar, and means actuated in the travel of the carriage for moving the end of said bar in the arc of a smaller circle concentric with the circle on which the tool is to be moved.

15. In a lathe, in combination, a cutting tool, a member carried by two pivots and supporting said cutting tool, and means for moving said pivots in the arcs of two concentric circles the center of which is located beyond the end of said member.

16. The combination recited in claim 15 in which said tool is slidable parallel to the axis of said member, whereby true circles of various diameters may be cut by a simple sliding adjustment of the tool.

17. In a lathe, in combination, a cutting tool, a member pivotally mounted intermediate its ends and carrying said tool, means pivotally associated with one end of said member for moving said end in a horizontal plane in the arc of a circle the center of which is located beyond the end of said member and means for rotating said member to keep its axis on a radius of said circle.

18. In a lathe, in combination, a cutting tool, a member pivotally mounted intermediate its ends and carrying said cutting tool, a non-rotatable member free to slide in any direction in a horizontal plane and pivotally connected to one end of said tool carrying member, a projecting arm on said non-rotatable member, cam means engaging the end of said projecting arm and constraining it to move along the arc of a circle of large radius, whereby said non-rotatable member is moved in the arc of a circle of the same radius but eccentric to said first mentioned circle and means for maintaining the pivots of said tool carrying member always on a radius of said second mentioned circle.

19. In a lathe, in combination, a member pivoted intermediate its ends and carrying a cutting tool, means for moving the pivot of said member in a horizontal plane in the arc of a circle the center of which is beyond the end of said member, and means for rotating said member around its pivotal point so as to keep its axis passing through the center of said circle, whereby the cutting tool always extends at the same angle to the face of the work.

20. In a lathe, in combination, a member pivoted intermediate its ends, means for moving the pivot of said member in a horizontal plane in the arc of a circle the center of which is beyond the end of said member, means for rotating said member to keep its axis passing through the center of said circle, a cutting tool carried by said member and adapted to slide along a line parallel to the axis of said member whereby said cutting tool may be adjusted to move in true circular arcs of various radii.

In testimony whereof I have hereunto set my hand.

DONALD L. DERROM.